(12) United States Patent
Chen

(10) Patent No.: US 10,678,491 B2
(45) Date of Patent: Jun. 9, 2020

(54) MULTI-SCREEN DISPLAY METHOD AND DISPLAY DEVICE

(71) Applicants: HKC Corporation Limited, Shenzhen (CN); Chongqing HKC Optoelectronics Technology Co., ltd., Chongqing (CN)

(72) Inventor: Yu-Jen Chen, Chongqing (CN)

(73) Assignees: HKC CORPORATION LIMITED, Shenzhen (CN); CHONGQING HKC OPTOELECTRONICS TECHNOLOGY CO., LTD., Chongqing (CN)

( * ) Notice: Subject to any disclaimer, the term of this patent is extended or adjusted under 35 U.S.C. 154(b) by 0 days.

(21) Appl. No.: 16/341,705

(22) PCT Filed: Dec. 16, 2017

(86) PCT No.: PCT/CN2017/116721
§ 371 (c)(1),
(2) Date: Apr. 12, 2019

(87) PCT Pub. No.: WO2018/121308
PCT Pub. Date: Jul. 5, 2018

(65) Prior Publication Data
US 2019/0294401 A1    Sep. 26, 2019

(30) Foreign Application Priority Data
Dec. 30, 2016 (CN) .......................... 2016 1 1265522

(51) Int. Cl.
*G06F 1/16* (2006.01)
*G06F 3/0482* (2013.01)
(Continued)

(52) U.S. Cl.
CPC .......... *G06F 3/1446* (2013.01); *G06F 1/1652* (2013.01); *G06F 3/033* (2013.01);
(Continued)

(58) Field of Classification Search
CPC ..................... G06F 1/1652; G06F 2203/04803
See application file for complete search history.

(56) References Cited

U.S. PATENT DOCUMENTS

2015/0370317 A1 * 12/2015 Cha .......................... G06F 3/002
345/676
2016/0109973 A1 * 4/2016 Kim ........................ G06F 3/041
(Continued)

FOREIGN PATENT DOCUMENTS

CN    103295510 A    *  9/2013
CN    103677727 A    *  3/2014
(Continued)

*Primary Examiner* — Michael Pervan
(74) *Attorney, Agent, or Firm* — WPAT, PC

(57) ABSTRACT

Embodiments of the disclosure provide a multi-screen display method and a display device including a curved surface display screen. The method is applied to the display device and includes the following steps. Position information of a preset folding line defined in the curved surface display screen is obtained when screen is bent according to the preset folding line, wherein the preset folding line is a boundary between the two adjacent sub-curved surface display screens formed thereby. A display interface of the screen is divided into a plurality of display sub-interfaces according to the position information, wherein a screen splitting line between two adjacent display sub-interfaces coincides with the preset folding line. The display contents selected by the user in the plurality of display sub-interfaces are obtained; and the adjusted display contents are displayed in the display sub-interfaces.

20 Claims, 6 Drawing Sheets

(51) Int. Cl.

| | | |
|---|---|---|
| *G06F 3/14* | (2006.01) | |
| *G09G 5/14* | (2006.01) | |
| *G06F 3/16* | (2006.01) | |
| *H04N 21/41* | (2011.01) | |
| *H04N 21/43* | (2011.01) | |
| *G06F 3/0488* | (2013.01) | |
| *G09F 9/30* | (2006.01) | |
| *G09F 9/302* | (2006.01) | |
| *G09G 5/00* | (2006.01) | |
| *G06F 3/033* | (2013.01) | |
| *H04N 21/431* | (2011.01) | |

(52) U.S. Cl.
CPC ........ *G06F 3/0482* (2013.01); *G06F 3/04886* (2013.01); *G06F 3/16* (2013.01); *G06F 3/165* (2013.01); *G09F 9/301* (2013.01); *G09F 9/3023* (2013.01); *G09F 9/3026* (2013.01); *G09G 5/006* (2013.01); *G09G 5/14* (2013.01); *H04N 21/4122* (2013.01); *H04N 21/431* (2013.01); *H04N 21/4307* (2013.01); *G06F 2203/04803* (2013.01); *G09G 2320/0261* (2013.01); *G09G 2340/14* (2013.01); *G09G 2354/00* (2013.01); *G09G 2360/04* (2013.01); *G09G 2380/02* (2013.01)

(56) References Cited

U.S. PATENT DOCUMENTS

| | | | | |
|---|---|---|---|---|
| 2016/0187994 | A1* | 6/2016 | La | G06F 1/1652 |
| | | | | 345/619 |
| 2016/0195938 | A1* | 7/2016 | Kim | H04B 1/3827 |
| | | | | 345/156 |
| 2016/0269671 | A1* | 9/2016 | Choi | H04N 5/45 |
| 2016/0357221 | A1* | 12/2016 | Huh | G06F 3/0487 |

FOREIGN PATENT DOCUMENTS

| | | | |
|---|---|---|---|
| CN | 105204800 A | * | 12/2015 |
| CN | 105955402 A | * | 9/2016 |
| CN | 106200803 A | * | 12/2016 |

\* cited by examiner

MULTI-SCREEN DISPLAY METHOD AND DISPLAY DEVICE

FIELD OF THE DISCLOSURE

The disclosure relates to the field of display technologies, and more particularly to a multi-screen display method and a display device.

BACKGROUND

At present, more and more liquid crystal panels need to use a curved surface display, and the curved surface display brings different experience to consumers and thus gradually becomes a new development direction in the industry. Wherein flexible curved surface displays (with a freely changed curvature) even attract more attention of users. However, if the existing curved displays are used, multiple users can only view a same picture content simultaneously, while if an existing screen splitting display technology or PBP technology is used, multiple users can view different picture contents simultaneously, but since a curved surface screen will cause mutual interference of the picture contents, a better visual experience is not realized.

SUMMARY

Embodiments of the disclosure provide a multi-screen display method and a display device, realizing that different users can view different picture contents without mutual interference from a same display screen.

The present disclosure provides a multi-screen display method, applied to a display device including a curved surface display screen, and the curved surface display screen is connected to a source device by an image transmission line. The multi-screen display method includes acquiring position information of a preset folding line defined in the curved surface display screen when it is detected that the curved surface display screen is bent an split along a preset folding line, wherein the curved surface display screen is bent and then split into at least two sub-curved surface display screens according to the preset folding line, and the preset folding line is a boundary between each two adjacent sub-curved surface display screens formed thereby; dividing a display interface of the curved surface display screen into a plurality of display sub-interfaces according to the position information, wherein a screen splitting line between two adjacent display sub-interfaces coincides with the preset folding line; receiving a multi-screen display request sent from the source device through the image transmission line; transferring an original resolution of the curved surface display screen into a plurality of adjusting resolutions according to a screen amount in the multi-screen display request and transmitting resolution data recorded the plurality of adjusting resolutions respectively to the source device; adjusting the resolutions of display contents selected by the user in the plurality of display sub-interfaces by the source device according to the resolution data, to accord with the plurality of adjusting resolutions respectively; acquiring the adjusted display contents adjusted and selected by the user in the plurality of display sub-interfaces from the source device through the image transmission line; and displaying the adjusted display contents selected in the display sub-interfaces through the display sub-interfaces.

In an embodiment, before the step of acquiring position information of a preset folding line defined in the curved surface display screen, the multi-screen display method further includes judging whether a multi-screen display function of the curved surface display screen is selected or not; and acquiring the position information of the preset folding line on the curved surface display screen if the multi-screen display function of the curved surface display screen is selected, and outputting a prompt message for prompting the user to select the multi-screen display function of the curved surface display screen if the multi-screen display function of the curved surface display screen is not selected.

In an embodiment, the preset folding line is a vertical folding line; and acquiring position information of a preset folding line defined in the curved surface display screen specifically includes acquiring pixel units of a corresponding column of the vertical folding line in the curved surface display screen.

In an embodiment, after the step of acquiring the adjusted display contents selected by the user in the plurality of display sub-interfaces, the multi-screen display method further includes judging whether the display contents have audio information; selecting one of audio channels used by the curved surface display screen if the display contents have audio information; and outputting the audio information by the selected audio channel.

In an embodiment, the preset folding line is a vertical folding line; and acquiring position information of a preset folding line defined in the curved surface display screen specifically includes acquiring pixel units of a corresponding column of the vertical folding line in the curved surface display screen.

In an embodiment, the user bends the curved surface display screen along the preset folding line is detected by a sensor.

In an embodiment, the sensor is a pressure sensor, and when a pressure value detected by the pressure sensor reaches certain preset pressure threshold range, then it is confirmed that the user wants to bend and then split the curved surface display screen.

In an embodiment, screen bending and splitting is carried out on the curved surface display screen by a user according to the preset folding line includes a portion of the curved surface display screen corresponding to the preset folding line protrudes out therefrom, to shield display contents of the display sub-interfaces on both sides of the screen splitting line.

The present disclosure also provides a display device, including a curved surface display screen, wherein the display device further includes a first acquiring module configured for acquiring position information of a preset folding line defined in the curved surface display screen when it is detected that the curved surface display screen is bent an split along a preset folding line, wherein the curved surface display screen is bent and then split into at least two sub-curved surface display screens according to the preset folding line, and the preset folding line is a boundary between each two adjacent sub-curved surface display screens formed thereby; a dividing module configured for dividing a display interface of the curved surface display screen into a plurality of display sub-interfaces according to the position information, wherein a screen splitting line between two adjacent display sub-interfaces coincides with the preset folding line; a second acquiring module configured for acquiring adjusted display contents adjusted and selected by the user in the plurality of display sub-interfaces; a display module configured for displaying the adjusted display contents selected in the display sub-interfaces through the display sub-interfaces; a memory configured for storing an original resolution of the display module; a connecting port configured for being connected to a source device by an image transmission line, to receive a multi-screen display request sent from the source device by the image transmission line and the adjusted display contents; and a display controller, coupled to the display module, the memory and the connecting port and configured for transferring the original resolution of the curved surface display screen into a plurality of adjusting resolutions according to a screen amount in the multi-screen display request and transmitting resolution data recorded the plurality of adjusting resolutions respectively to the source device, and respectively displaying the adjusted display contents selected in the display sub-interfaces and transmitted by the source device on the plurality of display sub-interfaces.

In an embodiment, the display device further includes a first judging module and a first prompting module; the first judging module is configured for judging whether a multi-screen display function of the curved surface display screen is selected or not; and the first acquiring module is configured for acquiring the position information of the preset folding line on the curved surface display screen if the multi-screen display function of the curved surface display screen is selected; the first prompting module is configured for outputting a prompt message for prompting the user to select the multi-screen display function of the curved surface display screen if the multi-screen display function of the curved surface display screen is not selected.

In an embodiment, the preset folding line is a vertical folding line; and the first acquiring module is specifically configured for acquiring pixel units of a corresponding column of the vertical folding line in the curved surface display screen.

In an embodiment, the display device further includes a second judging module configured for judging whether the display contents have audio information; a selecting module configured for selecting one of audio channels used by the curved surface display screen if the display contents have audio information; and an output module configured for outputting the audio information by the selected audio channel.

In an embodiment, the multiple audio channels are independent audio channels to respectively transmit different audio information simultaneously.

In an embodiment, the preset folding line is a vertical folding line; and the first acquiring module is specifically configured for acquiring pixel units of a corresponding column of the vertical folding line in the curved surface display screen.

In an embodiment, the display device further includes a sensor disposed in the preset folding line, to detect the screen bending and splitting carried out on the curved surface display screen by a user according to the preset folding line by the sensor.

In an embodiment, the sensor is a pressure sensor, and when a pressure value detected by the pressure sensor reaches certain preset pressure threshold range, then it is confirmed that the user wants to bend and then split the curved surface display screen.

In an embodiment, the display device further includes a screen splitting button disposed on the curved surface display screen, and the screen splitting button is configured for selecting a multi-screen display function of the curved surface display screen by pressing.

The present disclosure also provides a multi-screen display method, applied to a display device including a curved surface display screen, and the curved surface display screen is connected to a source device by an image transmission line. The multi-screen display method includes acquiring position information of a preset folding line defined in the curved surface display screen when it is detected that the curved surface display screen is bent an split along a preset folding line, wherein the curved surface display screen is bent and then split into at least two sub-curved surface display screens according to the preset folding line, and the preset folding line is a boundary between each two adjacent sub-curved surface display screens formed thereby; dividing a display interface of the curved surface display screen into a plurality of display sub-interfaces according to the position information, wherein a screen splitting line between two adjacent display sub-interfaces coincides with the preset folding line; receiving a multi-screen display request sent from the source device through the image transmission line; transferring an original resolution of the curved surface display screen into a plurality of adjusting resolutions according to a screen amount in the multi-screen display request and transmitting resolution data recorded the plurality of adjusting resolutions respectively to the source device; adjusting the resolutions of display contents selected by the user in the plurality of display sub-interfaces by the source device according to the resolution data, to accord with the plurality of adjusting resolutions respectively; acquiring the adjusted display contents adjusted and selected by the user in the plurality of display sub-interfaces from the source device through the image transmission line; and displaying the adjusted display contents selected in the display sub-interfaces through the display sub-interfaces, wherein before the step of acquiring position information of a preset folding line defined in the curved surface display screen, the multi-screen display method further includes judging whether a multi-screen display function of the curved surface display screen is selected or not; and acquiring the position information of the preset folding line on the curved surface display screen if the multi-screen display function of the curved surface display screen is selected, and outputting a prompt message for prompting the user to select the multi-screen display function of the curved surface display screen if the multi-screen display function of the curved surface display screen is not selected; wherein after the step of acquiring the adjusted display contents selected by the user in the plurality of display sub-interfaces, the multi-screen display method further includes judging whether the display contents have audio information; selecting one of audio channels used by the curved surface display screen if the display contents have audio information; and outputting the audio information by the selected audio channel; wherein the preset folding line is a vertical folding line; and acquiring position information of a preset folding line defined in the curved surface display screen specifically includes acquiring pixel units of a corresponding column of the vertical folding line in the curved surface display screen.

In an embodiment, the user bends the curved surface display screen along the preset folding line is detected by a sensor.

In an embodiment, the sensor is a pressure sensor, and when a pressure value detected by the pressure sensor reaches certain preset pressure threshold range, then it is confirmed that the user wants to bend and then split the curved surface display screen.

According to the embodiments of the disclosure, a physical screen bending and splitting manner is performed on the curved surface display screen by a user according to a preset folding line, screen splitting of a display interface corresponding to the physical screen bending and splitting manner is adopted on software to divide the curved surface display screen into a plurality of display sub-interfaces, which display different contents, thereby realizing that multiple uses view different picture contents simultaneously. Meanwhile, the disclosure applies a display port technology, the display contents selected in the plurality of display sub-interfaces provided by the single source device are transmitted to the display device by the single image transmission line, thereby realizing multi-screen display on the display device and saving wiring trouble of the user. Besides, the disclosure also adjusts the resolution data provided for the source device according to a multi-screen display request from the source device, such that the adjusted display contents provided by the source device can comply with actual display resolutions on the display device, thereby avoiding picture distortion caused by compression, and providing a better multi-screen display effect.

BRIEF DESCRIPTION OF THE DRAWINGS

In order to more clearly explain technical solutions of present disclosure or prior art, the drawings required in description of the embodiments or the prior art will be briefly introduced. It is obvious that the described drawings below are some embodiments of the present disclosure, and those ordinary skilled in the art can acquire other drawings according to these drawings, without paying any inventive work.

DETAILED DESCRIPTION OF PREFERRED EMBODIMENTS

The technical solutions of embodiments of the present disclosure will be described in a clearly and fully understandable way in connection with the drawings. It is obvious that the described embodiments are just a part but not all of the embodiments of the disclosure. Based on the described embodiments in the disclosure, those skilled in the art can acquire other embodiment(s), without any inventive work, which should be within the scope of the disclosure.

Figure 1:
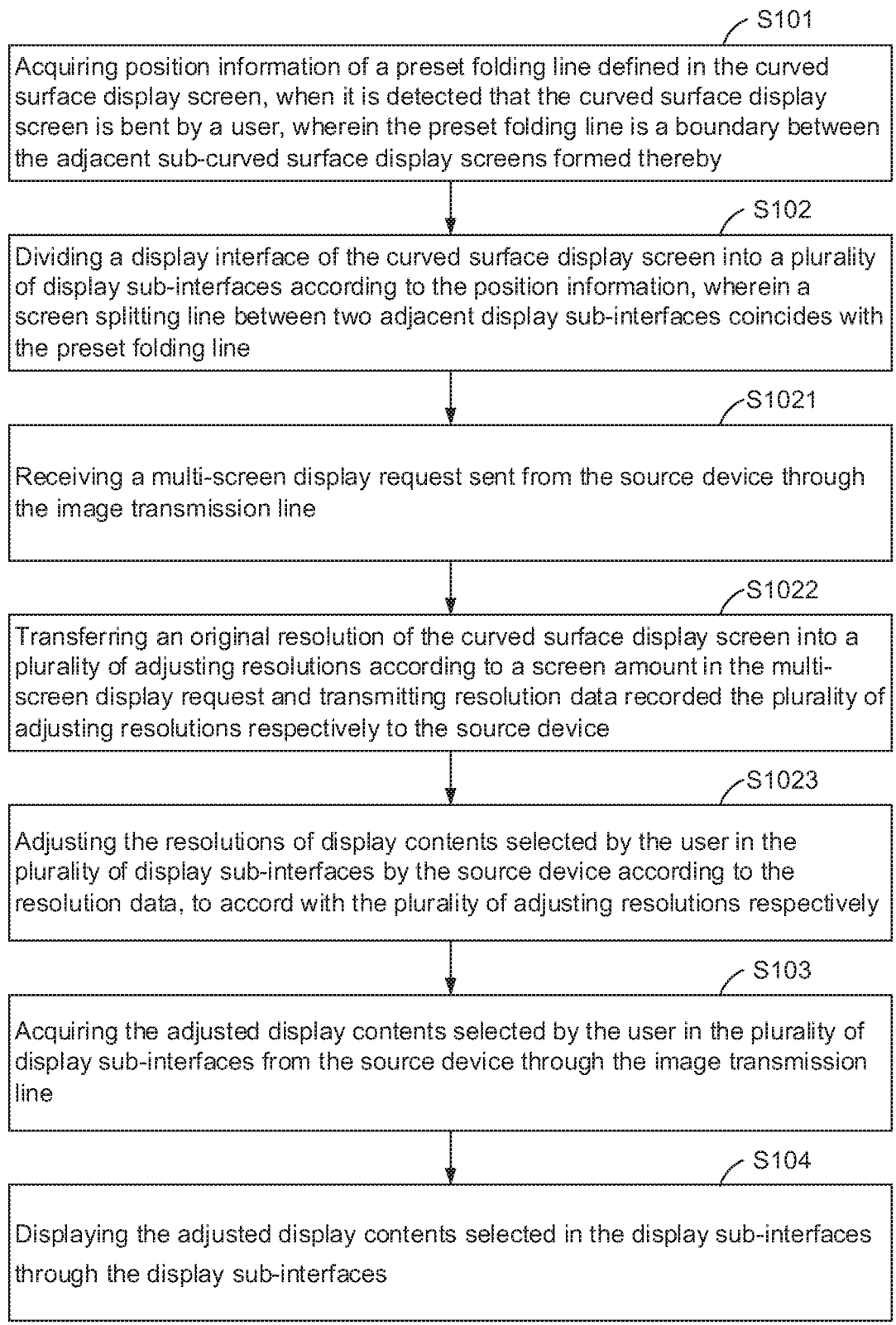
FIG. 1 is a schematic flowchart of a multi-screen display method provided by an embodiment of the disclosure.

Referring to FIG. 1, FIG. 1 is a schematic flowchart of a multi-screen display method provided by an embodiment of the disclosure. The multi-screen display method is applied to a display device, and the display device includes a curved surface display screen, the curved surface display screen is connected to a source device 313 by an image transmission line 314, and the curved surface display screen may be bent into a plurality of curved surface display screens by an external force. As shown in FIG. 1, the multi-screen display method includes steps S101 to S104.

S101, when it is detected that the user bends the curved surface display screen along a preset folding line, the position information of the preset folding line is obtained. The preset folding line is a boundary between each two adjacent sub-curved surface display screens formed thereby.

Figure 2:
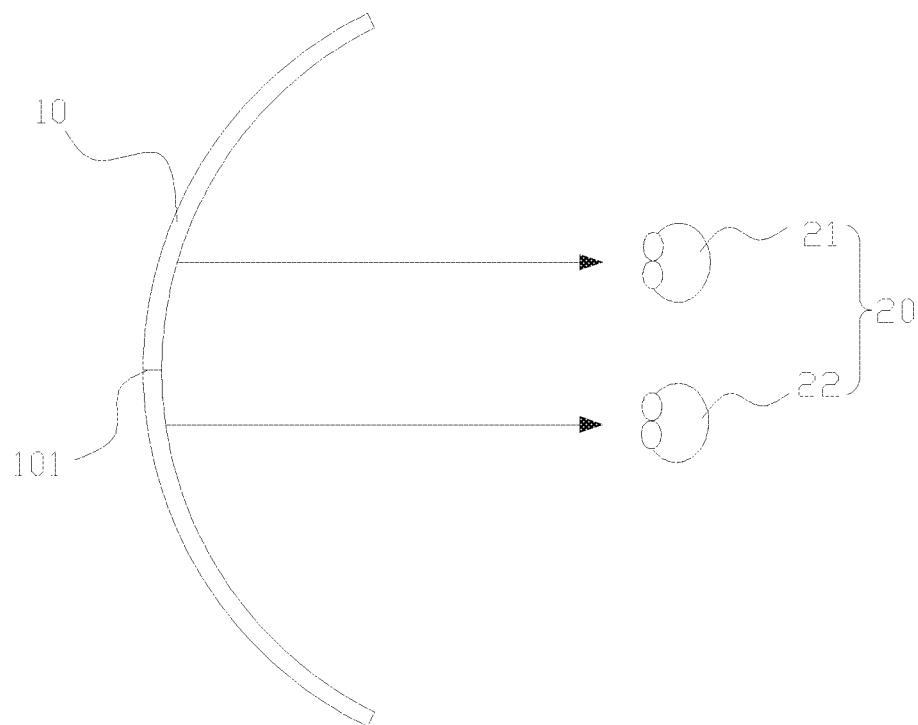
FIG. 2 is a schematic view of a user using a curved surface display screen provided by an embodiment of the disclosure.
Figure 3:
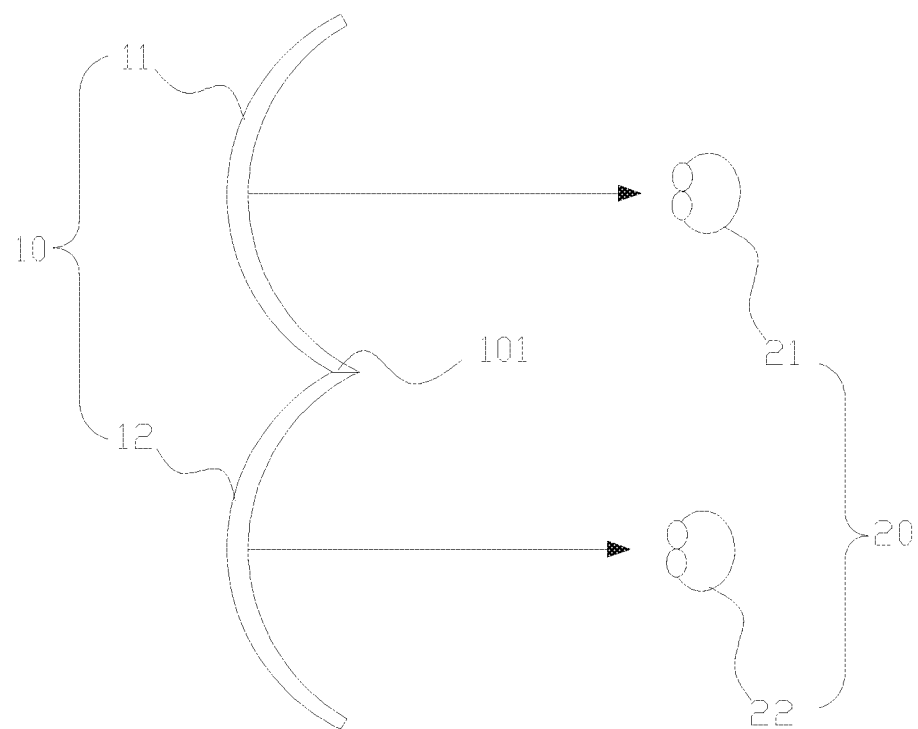
FIG. 3 is an effect schematic view when the user uses a multi-screen display method to view a curved surface display screen provided by an embodiment of the disclosure.
Figure 4:
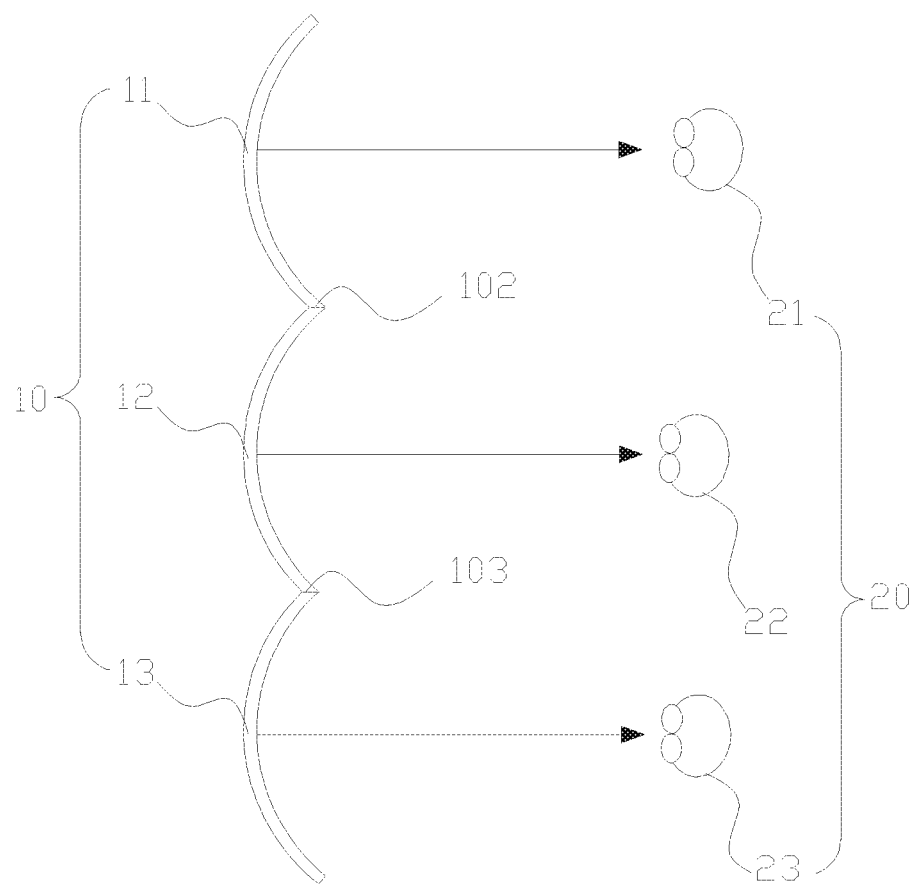
FIG. 4 is an effect schematic view when the user uses a multi-screen display method to view a curved surface display screen provided by an embodiment of the disclosure.

In the embodiment of the disclosure, when several users use the curved surface display screen to view the picture contents of the display screen, if the users want to view different picture contents simultaneously by using the curved surface display screen, then the curved surface display screen can be bent into at least two sub-curved surface display screens by an external force according to the preset folding line. The preset folding line is a boundary between each two adjacent sub-curved surface display screens formed thereby. Specifically, referring to FIGS. 2 and 3, FIG. 2 is a schematic view when a user uses a curved surface display screen for viewing provided by an embodiment of the disclosure, and FIG. 3 is an effect schematic view when the user uses a multi-screen display method for viewing by a curved surface display screen provided by an embodiment of the disclosure. As shown in FIG. 2, a curved surface display screen 10 is provided with a preset folding line 101. The number of the preset folding lines 101 may be one or more. When multiple users 20 (for example users 21 and 22) use the curved surface display screen 10 to view programs, the users 21 and 22 want to watch different programs using the curved surface display screen 10 simultaneously, then the curved surface display screen 10 may be bent and split according to the preset folding line 101, and two sub-curved surface display screens can be formed along the preset folding line 101. As shown in FIG. 3, the curved surface display screen 10 is bent and split into a first curved surface display screen 11 and a second curved surface display screen 12 according to the preset folding line 101. When a plurality of preset folding lines are defined, the curved surface display screen may be split into a plurality of sub-curved surface display screens. For example, a second preset folding line 102 and a third preset folding line 103 are defined in FIG. 4, and the curved surface display screen 10 may be bent and split into a first curved surface display screen 11, a second curved surface display screen 12, and a third curved surface display screen 13, according to the second preset folding line 102 and the third preset folding line 103.

When it is detected that the curved surface display screen is bent an split along a preset folding line, specifically, a sensor 321 may be used for detection. For example, a pressure sensor is arranged at the preset folding line, when a pressure value detected by the pressure sensor reaches certain preset pressure threshold range, it is confirmed that the user bends the cured surface display screen and wants to split it along the preset folding line. At this point, the position information of the preset folding line on the curved surface display screen is acquired, specifically, the preset folding line includes but not limited to be vertical folding lines. If the preset folding line is the vertical folding line, the corresponding column pixel units along the vertical folding line in the curved surface display screen are confirmed, the pixel units of said column may serve as the position information of the vertical folding line of the curved surface display screen. And the position information of the preset folding line of the curved surface display screen may also be determined by other manners.

S102, dividing a display interface of the curved surface display screen into a plurality of display sub-interfaces according to the position information, wherein a screen splitting line between two adjacent display sub-interfaces coincides with the preset folding line.

In the embodiment of the disclosure, the display interface of the curved surface display screen is divided into a plurality of display sub-interfaces according to the position information, specifically, the display interface of the curved surface display screen 10 is divided into a display sub-interface of the first curved surface display screen 11 and a display sub-interface of the second curved surface display screen 12, and the two display sub-interfaces are independent, may be scaled-down versions of the previous display interface of the curved surface display screen 10, and may also be new display interfaces. What is most important is that the screen splitting line of the two display sub-interfaces coincides with the preset folding line, and the position of the screen splitting line is decided by the preset folding line of the curved surface display screen. The screen splitting display of the display interfaces is correspondingly realized on software according to physical screen splitting of the curved surface display screen (bent into a plurality of display screens by hardware). Step S102 includes the following sub-steps S1021 to S1023.

S1021, receiving a multi-screen display request sent from the source device 313 through the image transmission line 314.

In the embodiment of the disclosure, specifically, the multi-screen display request for example will record the amount of screens of the source device 313 to be displayed on the display device, or the amount of the screens provided by the source device 313. For example, when the user controls the source device 313 to output the display contents of two screens, the source device 313 may transmit information that the amount of the display screens is 2 to the display device by the multi-screen display request.

S1022, an original resolution of the curved surface display screen is transferred into a plurality of adjusting resolutions according to the screen amount in the multi-screen display request and the resolution data recorded the plurality of adjusting resolutions is transmitted to the source device 313.

In the embodiment of the disclosure, specifically, the resolution data may be extension display identification data, and may be used for recording display resolutions of respective sub-curved surface display screens of a display module (mentioned below). The extension display identification data may be stored in a memory 310 (mentioned below) to be accessed by a display controller 312 (mentioned below) and transmitted to the source device 313. In other words, according to the embodiment of the disclosure, the adjusted adjusting resolutions are provided for the source device 313 by the display controller 312, such that the source device 313 may send the adjusted display contents with corresponding resolutions to respective sub-curved surface display screens for display. Therefore, the problem of picture distortion caused by different resolutions between the display contents and the display pictures during multi-screen display can be improved.

S1023, adjusting the resolutions of display contents selected by the user in the plurality of display sub-interfaces by the source device 313 according to the resolution data, to meet the plurality of adjusting resolutions respectively.

In the embodiment of the disclosure, specifically, the display controller 312 of the present embodiment may provide actual screen resolutions for the source device 313 by the recorded adjusting resolutions in the resolution data, such that the source device 313 may transmit the adjusted display contents according to the actual screen resolutions, thereby improving the problem of picture distortion since the display contents do not accord with the resolutions actually displayed on the display during multi-screen display.

S103, acquiring the adjusted display contents selected by the user in the plurality of display sub-interfaces from the source device 313 through the image transmission line 314.

In the embodiment of the disclosure, the adjusted display contents selected by the user in the plurality of display sub-interfaces are acquired from the source device 313 through the image transmission line 314. Specifically, if the user 21 and the user 22 want to view different screen contents, after the above steps, the user may select different video or character contents on the display sub-interface of the first curved surface display screen 11 and the display sub-interface of the second curved surface display screen 12. For example, if the user 21 selects a video A in the display sub-interface of the first curved surface display screen 11 and the user 22 selects a video B in the display sub-interface of the second curved surface display screen 12, the selected display contents after adjustment are obtained, that means, i.e., the adjusted video A and video B are acquired.

S104, the adjusted display contents which is selected in the display sub-interfaces, are displayed on the display sub-interfaces.

In the embodiment of the disclosure, for example, if the user 21 selects the video A in the display sub-interface of the first curved surface display screen 11, then the adjusted video A is displayed by the display sub-interface of the first curved surface display screen 11, and if the user 22 selects the video B in the display sub-interface of the second curved surface display screen 12, then the adjusted video B is displayed by the display sub-interface of the second curved surface display screen 12. Therefore, different users can view different display contents by the curved surface display screen and corresponding split screens of the display interface. Since when the display screen corresponding to the preset folding line of the curved surface display screen will protrude out when the curved surface display screen is bent, the preset folding line may also shield the display contents on both sides of the screen splitting line, such that the users truly visually enjoy the effect of two display screens, unlike the existing screen splitting technology, thereby realizing that different users can view different screen contents without mutual interference by use the same display screen. Meanwhile, the disclosure applies a display port technology, the display contents selected in the plurality of display sub-interfaces and provided by the single source device 313 are transmitted to the display device by the single image transmitting line 314, thereby realizing multi-screen display on the display device and saving wiring trouble of the users. In addition, the disclosure further adjusts the resolution data provided for the source device 313 according to the multi-screen display request from the source device 313, such that the adjusted display contents provided by the source device 313 will accord with the resolutions actually displayed on the display device, thereby avoiding the distortion of the image pictures caused by compression and providing a better multi-screen display effect.

Figure 5:
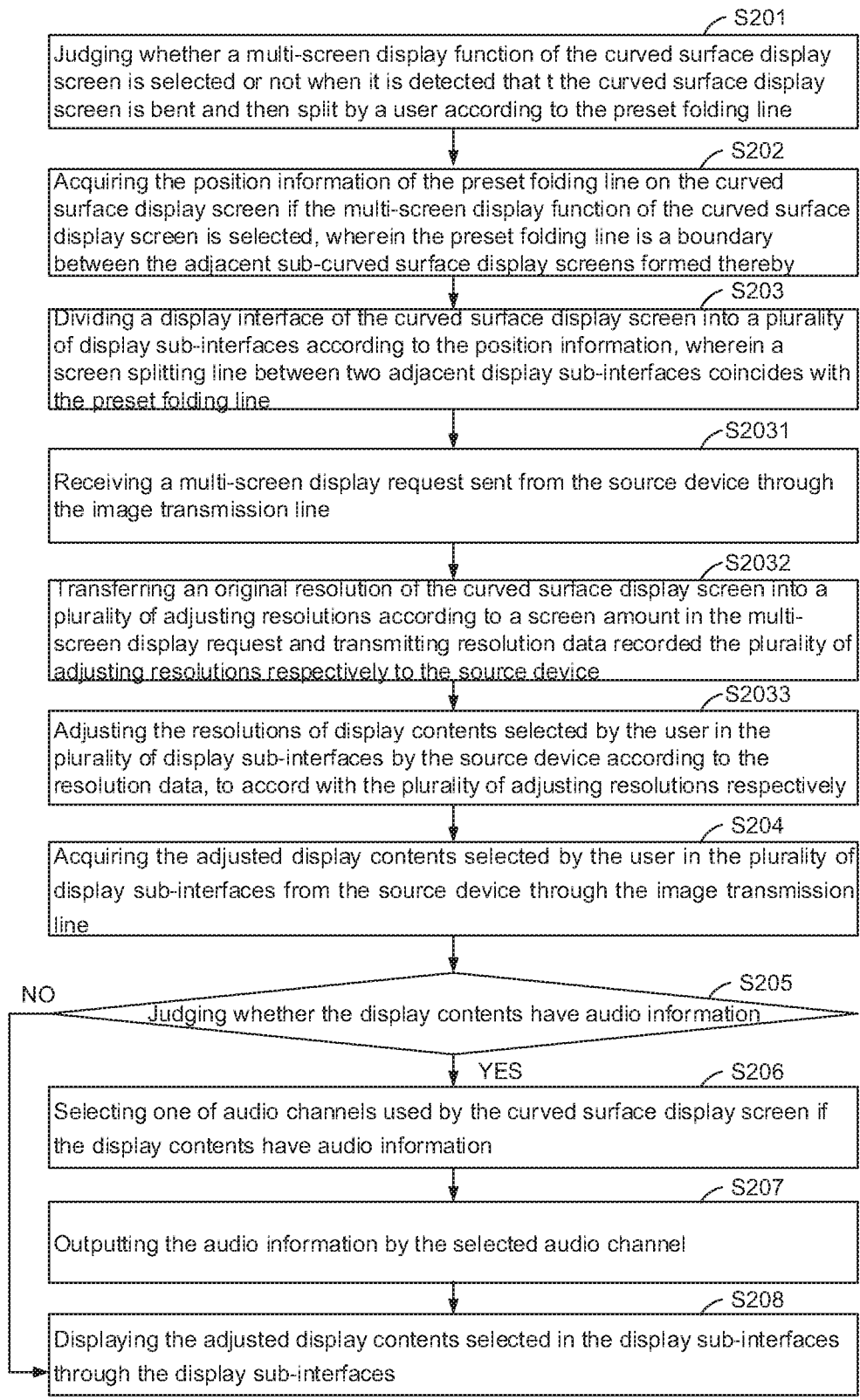
FIG. 5 is another schematic flowchart of a multi-screen display method provided by an embodiment of the disclosure.

Referring to FIG. 5, FIG. 5 is a schematic flowchart of a multi-screen display method provided by an embodiment of the disclosure. The multi-screen display method is applied to a display device, the display device includes a display screen, the curved surface display screen is connected to a source device 313 by the image transmitting line 314, the curved surface display screen can be bent into a plurality of curved surface display screens by an external force, the curved surface display screen is provided with a plurality of audio channels, or a host corresponding to the curved surface display screen includes a plurality of audio channels. As shown in FIG. 5, the multi-screen display method includes the following steps of S201-S206.

S201, judging whether a multi-screen display function of the curved surface display screen is selected or not, when it is detected that the user bends the curved surface display screen along a preset folding line.

In the embodiment of the disclosure, the multi-screen display function of the curved surface display screen may correspond to a screen splitting key mode, a screen splitting key 322 is disposed on the curved surface display screen. When the user bends the curved surface display screen and wants to split it along the preset folding line, the user is prompted to select the multi-function display function of the curved surface display screen, for example, the multi-function display function of the curved surface display screen may be selected by pressing the screen splitting key 322. Whether the multi-function display function of the curved surface display screen is selected or not is judged, step S202 is executed if the multi-function display function of the curved surface display screen is selected, and if the multi-function display function of the curved surface display screen is not selected, then a prompt message for prompting the user to select the multi-screen display function of the curved surface display screen is output.

S202, acquiring the position information of the preset folding line on the curved surface display screen if the multi-screen display function of the curved surface display screen is selected, wherein the preset folding line is a boundary between each two adjacent sub-curved surface display screens formed thereby.

In the embodiment of the disclosure, the position information of the preset folding line on the curved surface display screen is acquired, specifically, the preset folding line includes but not limited to be a vertical folding line. If the preset folding line is the vertical folding line, pixel units of a corresponding column of the vertical folding line in the curved surface display screen are acquired, the pixel units of such column may serve as the position information of the vertical folding line on the curved surface display screen, and the position information of the preset folding line on the curved surface display screen may also be determined by other manners.

S203, dividing a display interface of the curved surface display screen into a plurality of display sub-interfaces according to the position information, wherein a screen splitting line between two adjacent display sub-interfaces coincides with the preset folding line.

In the embodiment of the disclosure, a display interface of the curved surface display screen is divided into a plurality of display sub-interfaces according to the position information. Referring to FIG. 2, specifically, the display interface of the curved surface display screen 10 is divided into a display sub-interface of the first curved surface display screen 11 and a display sub-interface of the second curved surface display screen 12, and the two display sub-interfaces may be scaled-down versions of the display interface of the original curved surface display screen 10, and may also be new display interfaces. What is most important is that the screen splitting line of the two display sub-interfaces coincides with the preset folding line, and the position of the screen splitting line is decided by the preset folding line of the curved surface display screen. The screen splitting display of the display interfaces is correspondingly realized on software according to physical screen splitting of the curved surface display screen (bent into a plurality of display screens by hardware).

S2031, receiving a multi-screen display request sent from the source device 313 through the image transmission line 314.

S2032, differentiating an original resolution of the curved surface display screen into a plurality of adjusting resolutions according to a screen amount in the multi-screen display request and transmitting resolution data recorded the plurality of adjusting resolutions respectively to the source device 313.

S2033, adjusting the resolutions of display contents selected by the user in the plurality of display sub-interfaces by the source device 313 according to the resolution data, to accord with the plurality of adjusting resolutions respectively.

S204, obtaining the adjusted display contents selected by the user in the plurality of display sub-interfaces from the source device 313 through the image transmission line 314.

In the embodiment of the disclosure, the adjusted display contents selected by the user in the plurality of display sub-interfaces are acquired from the source device 313 through the image transmission line 314. Specifically, if the user 21 and the user 22 want to view different picture contents, after the above steps, the user may select different video or character contents on the display sub-interface of the first curved surface display screen 11 and the display sub-interface of the second curved surface display screen 12. For example, if the user 21 selects a video A in the display sub-interface of the first curved surface display screen 11 and the user 22 selects a video B in the display sub-interface of the second curved surface display screen 12, the adjusted display contents selected by the user, i.e., the adjusted video A and video B are obtained.

S205, judging whether the display contents have audio information.

In the embodiment of the disclosure, whether the display contents have audio information is judged, for example, the display contents are video A and video B, and the video A and video B may have audio information. A method for judging whether the display contents have audio information adopts an existing detection method for audio information, and is not described in detail here. If the display contents have audio information, step S206 is executed; and if the display contents have no audio information, then step S208 is executed.

S206, selecting one of audio channels used by the curved surface display screen if the display contents have audio information.

In the embodiment of the disclosure, the plurality of audio channels used by the curved surface display screen are independent audio channels, and may respectively transmit different audio information simultaneously. Different audio channels correspond to different audio devices, for example, an earphone interface and a loudspeaker, wherein a plurality of earphone interfaces and a plurality of loudspeakers may be disposed, and the plurality of earphone interfaces and loudspeakers are connected to different audio channels respectively.

S207, outputting the audio information by the selected audio channel.

In the embodiment of the disclosure, the selected audio channel refers to different audio channels selected for different split screens. The audio information in the display content selected in the split screen is output by the audio channel corresponding to the split screen, thereby realizing that different adjusted display contents are viewed by different display sub-interfaces of the curved surface display screen. Or the audio information of respective display contents may be only listened, mutual interference is prevented, and visual and audio experience during viewing is improved.

S208, displaying the adjusted display contents selected in the display sub-interfaces through the display sub-interfaces.

In the embodiment of the disclosure, for example, if the user 21 selects the video A in the display sub-interface of the first curved surface display screen 11, then the adjusted video A is displayed in the display sub-interface of the first curved surface display screen 11. If the user 22 selects the video B in the display sub-interface of the second curved surface display screen 12, then the adjusted video B is displayed in the display sub-interface of the second curved surface display screen 12.

According to the embodiments of the disclosure, a physical screen bending and splitting manner is performed on the curved surface display screen by a user according to a preset folding line, screen splitting of a display interface corresponding to the physical screen bending and splitting manner is adopted on software to divide the curved surface display screen into a plurality of display sub-interfaces, which display different contents, thereby realizing that multiple uses view different picture contents simultaneously. Meanwhile, the disclosure applies a display port technology, the display contents selected in the plurality of display sub-interfaces and provided by the single source device 313 are transmitted to the display device by the single image transmitting line 314, thereby realizing multi-screen display on the display device and saving wiring trouble of the users. In addition, the disclosure further adjusts the resolution data provided for the source device 313 according to the multi-screen display request from the source device 313, such that the adjusted display contents provided by the source device 313 will accord with the resolutions actually displayed on the display device, thereby avoiding the distortion of the image pictures caused by compression and providing a better multi-screen display effect.

Figure 6:
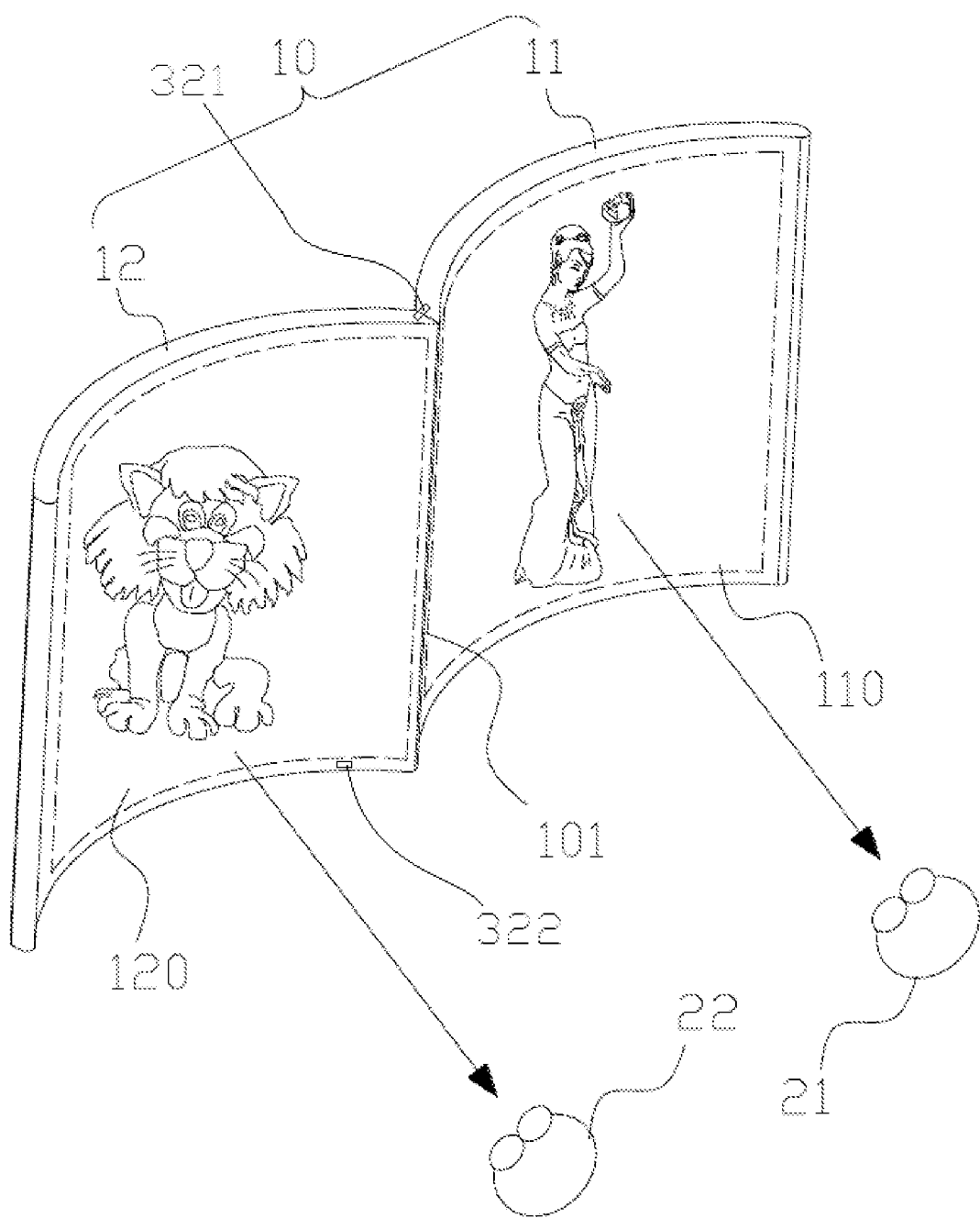
FIG. 6 is an effect schematic view when the user uses a mufti-screen display method to view a curved surface display screen provided by an embodiment of the disclosure.

A specific application scenario of the above method embodiment refers to FIG. 6, and FIG. 6 is an effect schematic view when the user uses a multi-screen display method to view a curved surface display screen provided by an embodiment of the disclosure. The curved surface display screen 10 may be bent into two curved surface display screens, i.e., a first curved surface display screen 11 and a second curved surface display screen 12 according to a preset folding line 101, and the curved surface display screens are connected to the source device 313 by an image transmitting line 314. When multiple users want to view different programs respectively by the curved surface display screen 10, the curved surface display screen 10 may be divided into the first curved surface display screen 11 and the second curved surface display screen 12 according to the preset folding line by an external force. When a main control unit of the display screen or a host connected to the display screen detects that the curved surface display screen 10 is divided into the first curved surface display screen 11 and the second curved surface display screen 12, position information of the preset folding line in the curved surface display screen 10 is acquired, the display interface of the curved surface display screen 10 is divided into a first display sub-interface 110 and a second display sub-interface 120 according to the position information. And then a multi-screen display request transmitted by the source device 313 through the image transmitting line 314 is received. An original resolution of the curved surface display screen is divided into a plurality of adjusting resolutions according to a screen amount in the multi-screen display request, resolution data respectively recording the plurality of adjusting resolutions are transmitted to the source device 313, the source device 313 adjusts the resolutions of the display contents selected by the user in the plurality of display sub-interfaces according to the resolution data to respectively accord with the plurality of adjusting resolutions. Then the adjusted display contents that the users want to view are acquired from the source device 313 by the image transmitting line 314 in the first display sub-interface 110 and the second display sub-interface 120, the adjusted display contents are displayed for different users. For example, users 21 and 22 by the first display sub-interface 110 and the second display sub-interface 120 respectively, and then different display contents can be enjoyed. Since physical screen splitting and software screen splitting are combined, the users use the multi-screen display method to view different display contents, and an effect of viewing two independent display screens is realized, thereby increasing viewing experience of the users.

Figure 7:
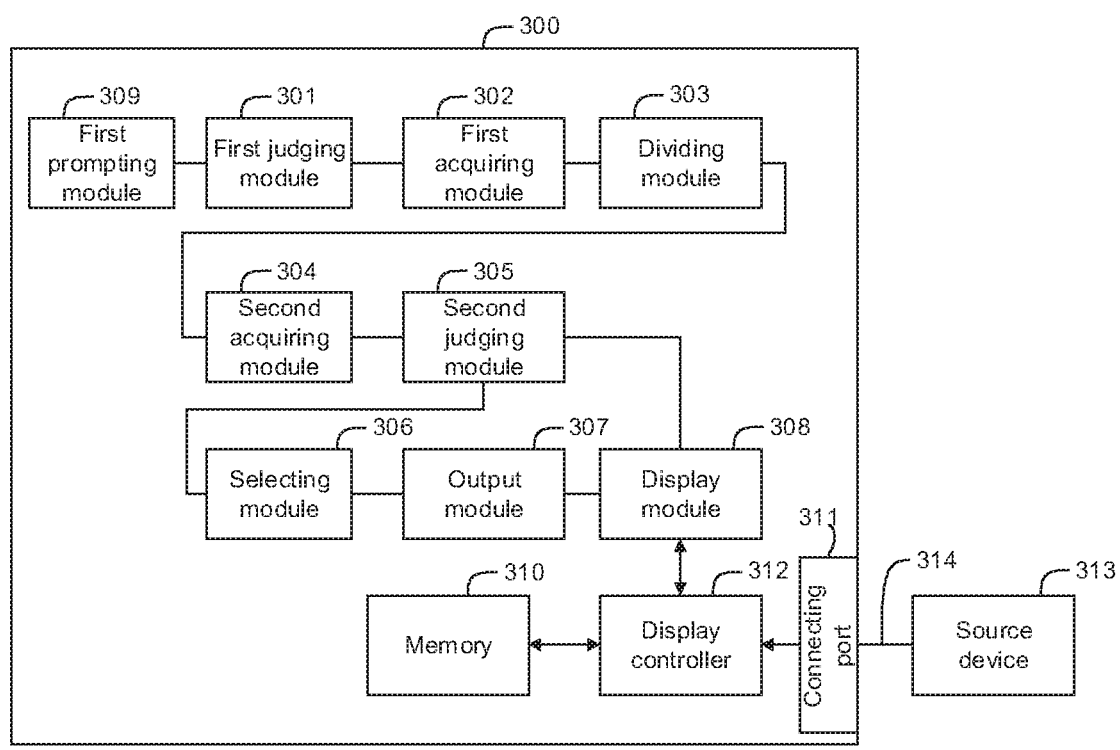
FIG. 7 is a schematic block diagram of a display device provided by an embodiment of the disclosure.

Referring to FIG. 7, FIG. 7 is a schematic block diagram of a display device by an embodiment of the disclosure. The display device includes a curved surface display screen, the curved surface display screen may be divided into a plurality of curved surface display screens by an external force. As shown in FIG. 7, the display device 300 includes a first judging module, a first acquiring module 302, a dividing module 303, a second acquiring module 304, a second judging module 305, a selecting module 306, an output module 307, a display module 308, a first prompting module 309, a memory 310, a connecting port 311, and a display controller 312.

The first judging module 301 is configured for judging whether a multi-screen display function of the curved surface display screen is selected or not, when it is detected that a user bends the screen and wants to split it along the preset folding line. The multi-screen display function of the curved surface display screen may correspond to a screen splitting key mode, a screen splitting key 322 is defined on the curved surface display screen. After the screen bending and splitting carried out on the curved surface display screen by the user according to the preset folding line, the user is prompted to select the multi-function display function of the curved surface display screen, for example, the multi-function display function of the curved surface display screen may be selected by pressing the screen splitting key 322.

The first acquiring module 302 is configured for acquiring the position information of the preset folding line on the curved surface display screen if the multi-screen display function of the curved surface display screen is selected, wherein the preset folding line is a boundary between each two adjacent sub-curved surface display screens formed thereby. The first acquiring module is specifically configured for acquiring pixel units of a corresponding column of the vertical folding line in the curved surface display screen. Specifically, the position information of the preset folding line on the curved surface display screen is acquired, specifically, the preset folding line includes but not limited to a vertical folding line, if the preset folding line is the vertical folding line, pixel units of a corresponding column of the vertical folding line in the curved surface display screen are obtained. The pixel units of such column may serve as the position information of the vertical folding line on the curved surface display screen, and the position information of the preset folding line on the curved surface display screen may also be determined by other manners.

The first prompting module 309 is configured for outputting a prompt message for prompting the user to select the multi-screen display function of the curved surface display screen if the multi-screen display function of the curved surface display screen is not selected. Specifically, the output prompt message for prompting the user to select the multi-screen display function of the curved surface display screen may non-restrictively include audio prompt contents output by a loudspeaker and/or video prompt contents output by using a display device.

The dividing module 303 is configured for dividing a display interface of the curved surface display screen into a plurality of display sub-interfaces according to the position information, wherein a screen splitting line between two adjacent display sub-interfaces coincides with the preset folding line. Specifically, referring to FIG. 2, a display interface of the curved surface display screen 10 is divided into a display sub-interface of a first curved surface display screen 11 and a display sub-interface of a second curved surface display screen 12.

The second acquiring module 304 is configured for acquiring adjusted display contents selected by the user in the plurality of display sub-interfaces. For example, a user 21 selects a video A in the display sub-interface of the first curved surface display screen 11 and a user 22 selects a video B in the display sub-interface of the second curved surface display screen 12. The adjusted display contents selected by the user are acquired, that is, the adjusted video A and the adjusted video B are acquired.

The second judging module 305 is configured for judging whether the display contents have audio information. Wherein an existing detection method for audio information is adopted. If the display contents have the audio information, then the selecting module 306 is called, and if the display contents have no audio information, then the display module 308 is called.

The selecting module 306 is configured for selecting one of audio channels used by the curved surface display screen if the display contents have audio information. Wherein the plurality of audio channels used by the curved surface display screen are independent audio channels, and may respectively transmit different audio information simultaneously, and different audio channels correspond to different audio devices, for example, an earphone interface and a loudspeaker, The output module 307 is configured for outputting the audio information by the selected audio channel. Specifically, the selected audio channel is that different audio channels are selected for different split screens. The audio information in the display contents selected in the split screen is output by the audio channel corresponding to the split screen, thereby realizing that different display contents are viewed through the display sub-interfaces of different curved surface display screens. Or the audio information of respective display contents may be only listened, mutual interference is prevented, and visual and audio experience during viewing is improved.

The display module 308 is configured for displaying the adjusted display contents selected in the display sub-interfaces through the display sub-interfaces. For example, if the user 21 selects the video A in the display sub-interface of the first curved surface display screen 11, then the adjusted video A is displayed by the display sub-interface of the first curved surface display screen 11. And if the user 22 selects the video B in the display sub-interface of the second curved surface display screen 12, then the adjusted video B is displayed by the display sub-interface of the second curved surface display screen 12.

The memory 310 is configured for storing an original resolution of the display module.

The connecting port 311 is configured for being connected to a source device 313 by an image transmission line 314, to receive a multi-screen display request sent from the source device 313 by the image transmission line 314 and the adjusted display contents.

The display controller 312 is coupled to the display module, the memory 310 and the connecting port 311 and configured for transferring the original resolution of the curved surface display screen into a plurality of adjusting resolutions according to a screen amount in the multi-screen display request and transmitting resolution data recorded the plurality of adjusting resolutions respectively to the source device 313, and respectively displaying the adjusted display contents selected in the display sub-interfaces and transmitted by the source device 313 on the plurality of display sub-interfaces.

In addition, the source device 313 may be a computer supporting a multi-series flow transmission technology of display ports of different standards (for example DP1.2) or other electronic devices providing image series flows. The connecting port 311 may be a transmission interface according with a display port technology or other transmission interfaces capable of providing the multi-series flow transmission technology to support the multi-series flow transmission technology.

According to the display device in the embodiment of the disclosure, a physical screen bending and splitting manner is performed on the curved surface display screen by a user according to a preset folding line, screen splitting of a display interface corresponding to the physical screen bending and splitting manner is adopted on software to divide the curved surface display screen into a plurality of display sub-interfaces, which display different contents, thereby realizing that multiple uses view different screen contents simultaneously. Meanwhile, the disclosure applies a display port technology, the display contents selected in the plurality of display sub-interfaces and provided by the single source device 313 are transmitted to the display device by the single image transmitting line 314, thereby realizing multi-screen display on the display device and saving wiring trouble of the users. In addition, the disclosure further adjusts the resolution data provided for the source device 313 according to the multi-screen display request from the source device 313, such that the adjusted display contents provided by the source device 313 will accord with the resolutions actually displayed on the display device, thereby avoiding the distortion of the image pictures caused by compression and providing a better multi-screen display effect.

Those skilled in the art can clearly know that for the purpose of convenience and compactness in description, specific working processes of the devices and modules described above can refer to corresponding processes in the foregoing method embodiment, and are not repeated here.

The steps in the method embodiment of the disclosure can be adjusted in sequence, merged and deleted according to actual needs.

The units or modules in the terminal embodiment of the disclosure can be merged, divided and deleted according to actual needs.

What are described above are only specific embodiments of the disclosure, but the protection scope of the disclosure is not limited thereto. It shall easily occur to one person skilled in the art within the technical scope of the disclosure that various changes or replacements shall be covered within the protective scope of the disclosure. Therefore, the scope of the disclosure should be the scope of the following claims.

What is claimed is:

1. A multi-screen display method, applied to a display device comprising a curved surface display screen wherein the curved surface display screen is connected to a source device by an image transmission line, and the method comprising:
   acquiring position information of a preset folding line defined in the curved surface display screen, when it is detected that the curved surface display screen is bent an split along a preset folding line, wherein the curved surface display screen is bent and then split into at least two sub-curved surface display screens according to the preset folding line, and the preset folding line is a boundary between each two adjacent sub-curved surface display screens formed thereby;
   dividing a display interface of the curved surface display screen into a plurality of display sub-interfaces according to the position information, wherein a screen splitting line between two adjacent display sub-interfaces coincides with the preset folding line;
   receiving a multi-screen display request sent from the source device through the image transmission line;
   transferring an original resolution of the curved surface display screen into a plurality of adjusting resolutions according to a screen amount in the multi-screen display request and transmitting resolution data to the source device;
   adjusting the resolutions of display contents selected by the user in the plurality of display sub-interfaces by the source device according to the resolution data;
   acquiring the adjusted display contents selected by the user in the plurality of display sub-interfaces from the source device through the image transmission line; and
   displaying the adjusted display contents selected in the display sub-interfaces through the display sub-interfaces.

2. The multi-screen display method according to claim 1, wherein before the step of acquiring position information of the preset folding line in the curved surface display screen, the multi-screen display method further comprises:
   judging whether a multi-screen display function of the curved surface display screen is selected or not; and
   acquiring the position information of the preset folding line on the curved surface display screen if the multi-screen display function of the curved surface display screen is selected, and outputting a prompt message for prompting the user to select the multi-screen display function of the curved surface display screen if the multi-screen display function of the curved surface display screen is not selected.

3. The multi-screen display method according to claim 2, wherein the preset folding line is a vertical folding line; and
   acquiring position information of a preset folding line defined in the curved surface display screen specifically comprises acquiring pixel units of a corresponding column of the vertical folding line in the curved surface display screen.

4. The multi-screen display method according to claim 1, wherein after the step of acquiring the adjusted display contents selected by the user in the plurality of display sub-interfaces, the multi-screen display method further comprises:
   judging whether the display contents have audio information;
   selecting one of audio channels used by the curved surface display screen if the display contents have audio information; and
   outputting the audio information by the selected audio channel.

5. The multi-screen display method according to claim 4, wherein the preset folding line is a vertical folding line; and
   acquiring position information of a preset folding line defined in the curved surface display screen specifically comprises acquiring pixel units of a corresponding column of the vertical folding line in the curved surface display screen.

6. The multi-screen display method according to claim 1, wherein the user bends the curved surface display screen along the preset folding line is detected by a sensor.

7. The multi-screen display method according to claim 6, wherein the sensor is a pressure sensor, and when a pressure value detected by the pressure sensor reaches certain preset pressure threshold range, then it is confirmed that the user wants to bend and then split the curved surface display screen.

8. The multi-screen display method according to claim 1, wherein a portion of the curved surface display screen corresponding to the preset folding line protrudes out therefrom, to shield display contents of the display sub-interfaces on both sides of the screen splitting line.

9. A display device, comprising:
   a curved surface display screen;
   a first acquiring module configured for acquiring position information of a preset folding line defined in the curved surface display screen, when it is detected that the curved surface display screen is bent by a user according to the preset folding line, wherein the curved surface display screen is bent and then split into at least two sub-curved surface display screens according to the preset folding line, and the preset folding line is a boundary between each two adjacent sub-curved surface display screens formed thereby;
   a dividing module configured for dividing a display interface of the curved surface display screen into a plurality of display sub-interfaces according to the position information, wherein a screen splitting line between two adjacent display sub-interfaces coincides with the preset folding line;
   a second acquiring module configured for acquiring adjusted display contents selected by the user in the plurality of display sub-interfaces;
   a display module configured for displaying the adjusted display contents selected in the display sub-interfaces through the display sub-interfaces;
   a memory configured for storing an original resolution of the display module;
   a connecting port connected to a source device by an image transmission line, and being configured to receive a multi-screen display request sent from the source device through the image transmission line and the adjusted display contents; and
   a display controller coupled to the display module, the memory, and the connecting port, and being configured to differentiate the original resolution of the curved surface display screen into a plurality of adjusting resolutions according to a screen amount in the multi-screen display request, and transmit resolution data to the source device, and respectively display the adjusted display contents on the plurality of display sub-interfaces.

10. The display device according to claim 9, wherein the display device further comprises a first judging module and a first prompting module;
the first judging module is configured for judging whether a multi-screen display function of the curved surface display screen is selected or not; and
the first acquiring module is configured for acquiring the position information of the preset folding line on the curved surface display screen if the multi-screen display function of the curved surface display screen is selected;
the first prompting module is configured for outputting a prompt message for prompting the user to select the multi-screen display function of the curved surface display screen if the multi-screen display function of the curved surface display screen is not selected.

11. The display device according to claim 10, wherein the preset folding line is a vertical folding line; and
the first acquiring module is specifically configured for acquiring pixel units of a corresponding column of the vertical folding line in the curved surface display screen.

12. The display device according to claim 9, wherein the display device further comprises a second judging module, a selecting module, and an output module; the second judging module is configured for judging whether the display contents have audio information;
the selecting module is configured for selecting one of audio channels used by the curved surface display screen if the display contents have audio information; and
the output module is configured for outputting the audio information by the selected audio channel.

13. The display device according to claim 12, wherein the multiple audio channels are independent audio channels to respectively transmit different audio information simultaneously.

14. The display device according to claim 12, wherein the preset folding line is a vertical folding line; and
the first acquiring module is specifically configured for acquiring pixel units of a corresponding column of the vertical folding line in the curved surface display screen.

15. The display device according to claim 9, wherein the display device further comprises a sensor defined in the preset folding line, to detect the curved surface display screen is bent and split by a user according to the preset folding line.

16. The display device according to claim 15, wherein the sensor is a pressure sensor, and when a pressure value detected by the pressure sensor reaches certain preset pressure threshold range, then it is confirmed that the user wants to bend and then split the curved surface display screen.

17. The display device according to claim 9, wherein the display device further comprises a screen splitting button defined on the curved surface display screen, and the screen splitting button is configured for selecting a multi-screen display function of the curved surface display screen by pressing.

18. A multi-screen display method, applied to a display device comprises a curved surface display screen and the curved surface display screen is connected to a source device by an image transmission line, the method comprising: acquiring position information of a preset folding line defined in the curved surface display screen, when screen bending and splitting carried out on the curved surface display screen by a user according to the preset folding line is detected and a portion of the display screen corresponding to the preset folding line protrudes out therefrom, wherein the curved surface display screen is bent and then split into at least two sub-curved surface display screens according to the preset folding line, and the preset folding line is a boundary between each two adjacent sub-curved surface display screens formed by the screen bending and splitting;
dividing a display interface of the curved surface display screen into a plurality of display sub-interfaces according to the position information, wherein a screen splitting line between two adjacent display sub-interfaces coincides with the preset folding line;
receiving a multi-screen display request sent from the source device through the image transmission line;
transferring an original resolution of the curved surface display screen into a plurality of adjusting resolutions according to a screen amount in the multi-screen display request and transmitting resolution data recorded the plurality of adjusting resolutions respectively to the source device;
adjusting the resolutions of display contents selected by the user in the plurality of display sub-interfaces by the source device according to the resolution data, to accord with the plurality of adjusting resolutions respectively;
acquiring the adjusted display contents selected by the user in the plurality of display sub-interfaces from the source device through the image transmission line; and
displaying the adjusted display contents selected in the display sub-interfaces through the display sub-interfaces;
wherein before the step of acquiring position information of a preset folding line defined in the curved surface display screen, the multi-screen display method further comprises:
judging whether a multi-screen display function of the curved surface display screen is selected or not; and
acquiring the position information of the preset folding line on the curved surface display screen if the multi-screen display function of the curved surface display screen is selected, and outputting a prompt message for prompting the user to select the multi-screen display function of the curved surface display screen if the multi-screen display function of the curved surface display screen is not selected;
wherein after the step of acquiring the adjusted display contents selected by the user in the plurality of display sub-interfaces, the multi-screen display method further comprises:
judging whether the display contents have audio information;
selecting one of audio channels used by the curved surface display screen if the display contents have audio information; and
outputting the audio information by the selected audio channel;
wherein the preset folding line is a vertical folding line; and
acquiring position information of a preset folding line defined in the curved surface display screen specifically comprises acquiring pixel units of a corresponding column of the vertical folding line in the curved surface display screen.

19. The multi-screen display method according to claim 18, wherein the screen bending and splitting carried out on the curved surface display screen by a user according to the preset folding line is detected by a sensor.

20. The multi-screen display method according to claim 19, wherein the sensor is a pressure sensor, and when a pressure value detected by the pressure sensor reaches certain preset pressure threshold range, the screen bending and splitting carried out on the curved surface display screen by a user according to the preset folding line is judged.

* * * * *